(12) United States Patent
Evslin

(10) Patent No.: US 7,031,450 B2
(45) Date of Patent: Apr. 18, 2006

(54) CALL ROUTING SYSTEM AND METHOD

(75) Inventor: Tom Evslin, Princeton, NJ (US)

(73) Assignee: ITXL IP Holdings, S.A.R.L., (LU)

( * ) Notice: Subject to any disclaimer, the term of this patent is extended or adjusted under 35 U.S.C. 154(b) by 196 days.

(21) Appl. No.: 10/228,527

(22) Filed: Aug. 27, 2002

(65) Prior Publication Data

US 2004/0042605 A1 Mar. 4, 2004

(51) Int. Cl.
*H04M 7/00* (2006.01)

(52) U.S. Cl. .................... 379/220.01; 379/221.01; 379/272; 379/273

(58) Field of Classification Search ............... 379/219, 379/220.01, 221.01, 900, 272, 273; 370/352, 370/356, 467
See application file for complete search history.

(56) References Cited

U.S. PATENT DOCUMENTS

| | | | |
|---|---|---|---|
| 5,406,620 A * | 4/1995 | Pei ..................... | 379/221.02 |
| 5,793,859 A * | 8/1998 | Matthews ............... | 379/211.03 |
| 5,896,448 A * | 4/1999 | Holt ..................... | 379/221.03 |
| 6,205,135 B1 * | 3/2001 | Chinni et al. ............ | 370/356 |
| 6,366,576 B1 * | 4/2002 | Haga ................... | 370/352 |
| 6,373,857 B1 * | 4/2002 | Ma ..................... | 370/475 |
| 6,404,746 B1 * | 6/2002 | Cave et al. .............. | 370/262 |
| 6,404,864 B1 | 6/2002 | Evslin et al. | |
| 6,584,110 B1 * | 6/2003 | Mizuta et al. ............ | 370/401 |
| 6,600,735 B1 * | 7/2003 | Iwama et al. ............ | 370/352 |
| 6,606,668 B1 * | 8/2003 | MeLampy et al. ......... | 709/241 |
| 6,791,970 B1 * | 9/2004 | Ng et al. ............... | 370/352 |

* cited by examiner

*Primary Examiner*—Bing Q. Bui
(74) *Attorney, Agent, or Firm*—Kaplan Gilman Gibson & Dernier LLP

(57) ABSTRACT

A method and system is provided wherein routing information is obtained from previously cached information or from a gatekeeper. An originating gateway in a network receives a request for a connection and determines whether pertinent routing information is cached. If available, the cached routing is used to attempt to establish a connection. If no previously established routing is available, the originating gateway requests preferred routing from a gatekeeper, including prioritized selections of terminating gateways through which to make a connection to a designated call recipient.

23 Claims, 2 Drawing Sheets

CALL ROUTING SYSTEM AND METHOD

FIELD OF THE INVENTION

The present invention relates to the field of telephony, and more particularly, to a system and method for routing of calls through a data network based upon the application of a set of rules while minimizing unnecessary repetitive execution of those rules.

BACKGROUND OF THE INVENTION

The basic model for completing a telephone call is changing. Rather that rely completely on end to end circuit switched connections, more and more phone calls are completed using, at least in part, packet switching techniques. More systems and equipment are being developed that are dedicated to transmission of voice communication on the Internet. As more of these systems and equipment become available, the complexity of the communications matrix increases.

In computer-based telephony systems, it is known to conduct a telephone call utilizing a combination of public switched telephone network (PSTN) links, and packet telephony links. An example of such a system is shown in U.S. Pat. No. 6,404,864 ("the '864 patent") owned by the assignee of the present invention. In such prior systems, an "originating gateway" takes the call from the PSTN to the Internet, and a "terminating gateway" places the call back on the PSTN at a remote location after removing it from the Internet. Thus, a long distance call may have three "legs" a first PSTN leg from the calling telephone to the originating gateway, a second leg from the originating gateway to a terminating gateway, and a third leg from a terminating gateway to a called telephone.

The '864 patent is directed to a system that helps the originating gateway pick which of several terminating gateways that are located in the remote location should be selected to complete the call from the Internet, over a PSTN link, to a destination terminal. The '864 patent is incorporated herein in its entirety by reference.

Of course, not all terminating gateways are equal; some are more desirable than others on the basis of their speed, economics, voice quality, reliability or other considerations. Thus, to optimize the overall efficiency of the transmission operation, a system preferably should select a routing based on the application of rules incorporating pre-established criteria, some of which are noted above.

Typically, there is a set of rules that gets executed in the system in order to ascertain the appropriate terminating gateway or other routing to use. These rules are executed for each call, and are often executed at an intelligent server that is remote from both the originating gateway and the terminating gateway. Therefore, there is additional communications overhead for the originating gateway to communicate with the intelligent server for each call. Often, the communications involves sending one or more parameters of the call (e.g. the called number) from the gateway to the intelligent node, executing some routing rules at the intelligent node, and returning a response that specifies one or more terminating gateways that can be used to complete the call. The terminating gateway takes the call from the Internet and completes it to a remote destination, usually using a PSTN link.

It is an object of the present invention to provide a system and method for call routing through a network which reduces the communications and processing overhead required for each call and applies routing rules to execute and select a terminating gateway for each call.

This and other objects of the invention disclosed will become more apparent from the description of the invention to follow.

SUMMARY OF THE INVENTION

The above and other problems of the prior art are overcome in accordance with the present invention that relates to a system for temporarily and locally storing (i.e. caching) the outcome of routing rules for future use. In accordance with the invention, a gateway requesting routing information from an intelligent node will store at least the received information and parameter of the call upon which the routing information is based. Thus, the required routing information for a subsequent call having the same parameters is available locally, at the originating gateway. When a subsequent call arrives with similar parameters, the gateway may use the same routing result, rather than having to retransmit the parameters to the intelligent node. Thus, for subsequent calls, no additional communications overhead is incurred to contact the intelligent node, no processing overhead is incurred to calculate the route and processing time delay is minimized.

In enhanced embodiments, the caching may be replaced periodically, or upon certain conditions such as timeout or other occurrence whereby the intelligent node recognizes that the previous information it has sent for caching to gateways is outdated. Additionally, the caching may include the use of authentication information. Thus, calls are routed using routes calculated during a prior call if possible. If not possible, calls are routed using a route calculated for the call in question, but that route is then used for future calls with similar parameters.

DETAILED DESCRIPTION OF THE INVENTION

Figure 1:
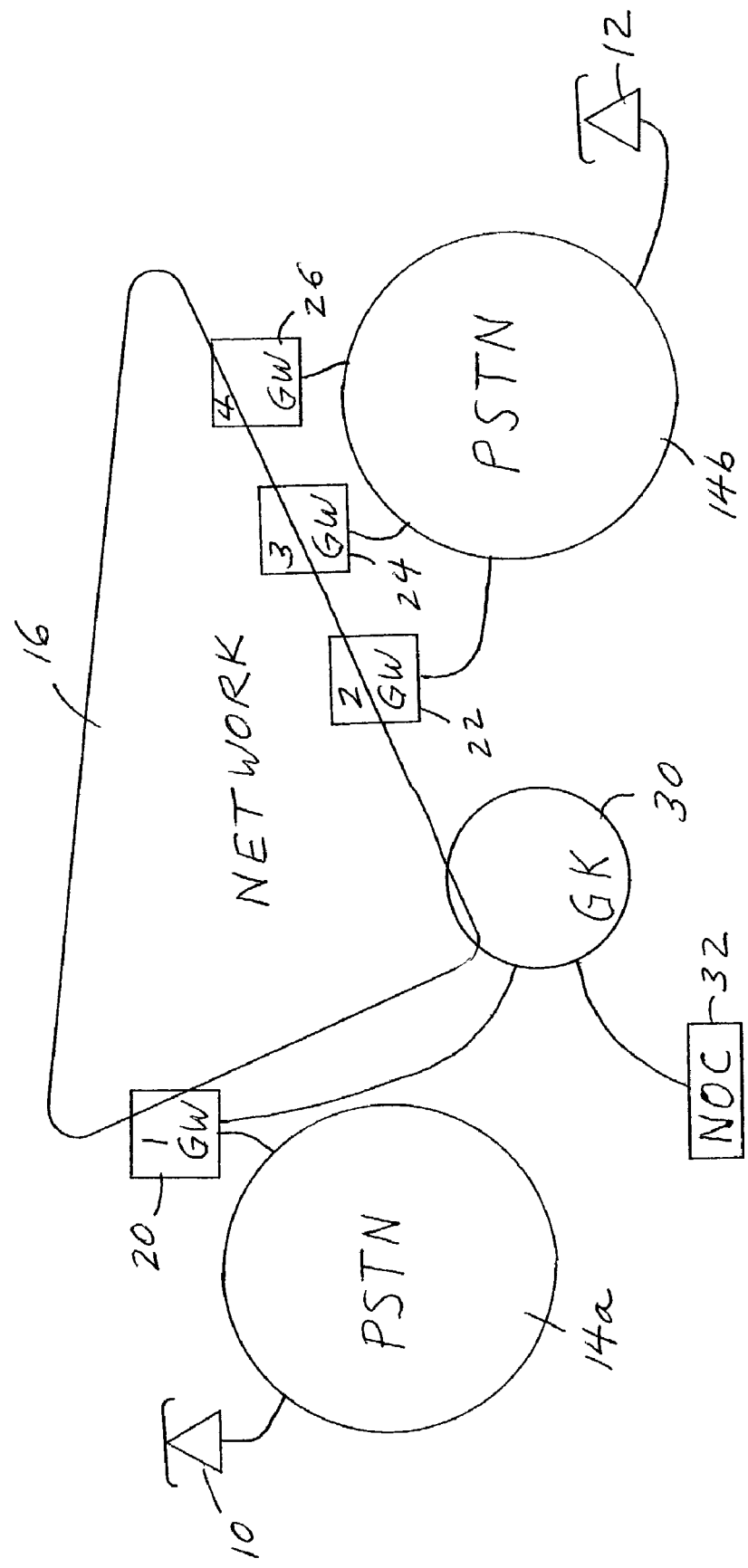
FIG. 1 is a schematic diagram of a communication network in which various components are connectable to one another by way of a packet switched network.

The invention is described below in terms of a communications network as illustrated in FIG. 1 for use in implementing a voice communication session between a caller device 10 and a callee device 12. Caller device 10 may be a hard wired telephone that connects directly to PSTN 14a, a cell phone that connects to PSTN 14a through intermediate receptor towers and relay stations, a voice-enabled client computer or any device that connects via IP. Similarly, termination callee device 12 may be a conventional phone, a cell phone, or an IP enabled endpoint. PSTN 14a and PSTN 14b are represented to be local segments of the universal PSTN to which all telephone communications eventually connect. Whereas PSTN 14a is portrayed as being in the vicinity of caller device 10, for example in the New York area, PSTN 14b is portrayed as being in the vicinity of callee device 12 which may be across the country or around the world. While a single gateway GW1 20 is shown connected to PSTN 14a, this representation is for purposes of simplicity in establishing a session and transmitting a communication from caller device 10 through a typical gateway for access to a network 16. In an actual communications network, plural originating gateways would be connected to PSTN 14a as is shown for plural terminating gateways in relation to PSTN 14b, the actual number of gateways being related to the expected communication traffic and bandwidth utilization. Thus, gateways GW2 22, GW3 24 and GW4 26 are also representational.

Although a gateway device is fundamentally a computer, a gateway is capable of performing numerous functions according to programming. Typically, a gateway is utilized to translate between two different types of networks, such as a telephone network and a packet switched data network. Whereas, several gateways are illustrated and described as being separate devices, the functions performed are the significant inventive features, and could be incorporated within caller device 10.

A gatekeeper, for example GK 30, is charged with determining the best routing for connecting a particular call from a caller device to a callee device. A gatekeeper is an example of the intelligent node that determines routing information. For purposes of explanation herein, we use a gatekeeper system, although it is understood that the gatekeeper is not the only manner of implementing the intelligent node, and that any type of computer may serve the same function. Moreover, it is also possible that in some circumstances the intelligent node and the gateway may be built on the same hardware platform.

The determination of which routing is best, and on what basis, is the subject of various criteria, for example which route or which terminating gateway provides the lowest cost, the fastest connection speed, the highest transmission quality, bandwidth availability or preferential determination based on other factors. In the present invention, in initiating a communication session, gateway GW1 20 is responsible for determining a preferred routing for a call initiated from caller device 10 and designated for remotely located callee device 12. As is shown, there is a plurality of possible gateways, GW2 22, GW3 24 and GW4 26, by which such a call may be routed. Initiating gateway GW1 20, either singly, or with input from gatekeeper GK 30, determines through which terminating gateway a specific call is to be routed, as will be described below. There may be a plurality of different endpoints at which a called party can be reached—a computer, a landline phone, a cell phone, a pager etc. and the current active one may be what is retrieved from the GK and cached by the caller or calling gateway.

A network such as is illustrated in FIG. 1 frequently includes a network operations center (NOC), the function of which is to provide instructions and modifications to various components of the network. NOC 32 is shown as connected to GK 30 so as to enable the provision of such instructions and modifications in addition to optionally communicating information designated gateways or other system components. Revised routing or other control criteria may be supplied to NOC 32 by a system operator through a GUI or be received and compiled by NOC 32 based on changes in time charges, connection speed, or other factors communicated directly from connected gateways. In one described embodiment, NOC 32 is operative to modify routing criteria, or rules, by which GK 30 evaluates the selected terminating GW in response to a particular originating GW request for a communication session.

Figure 2:
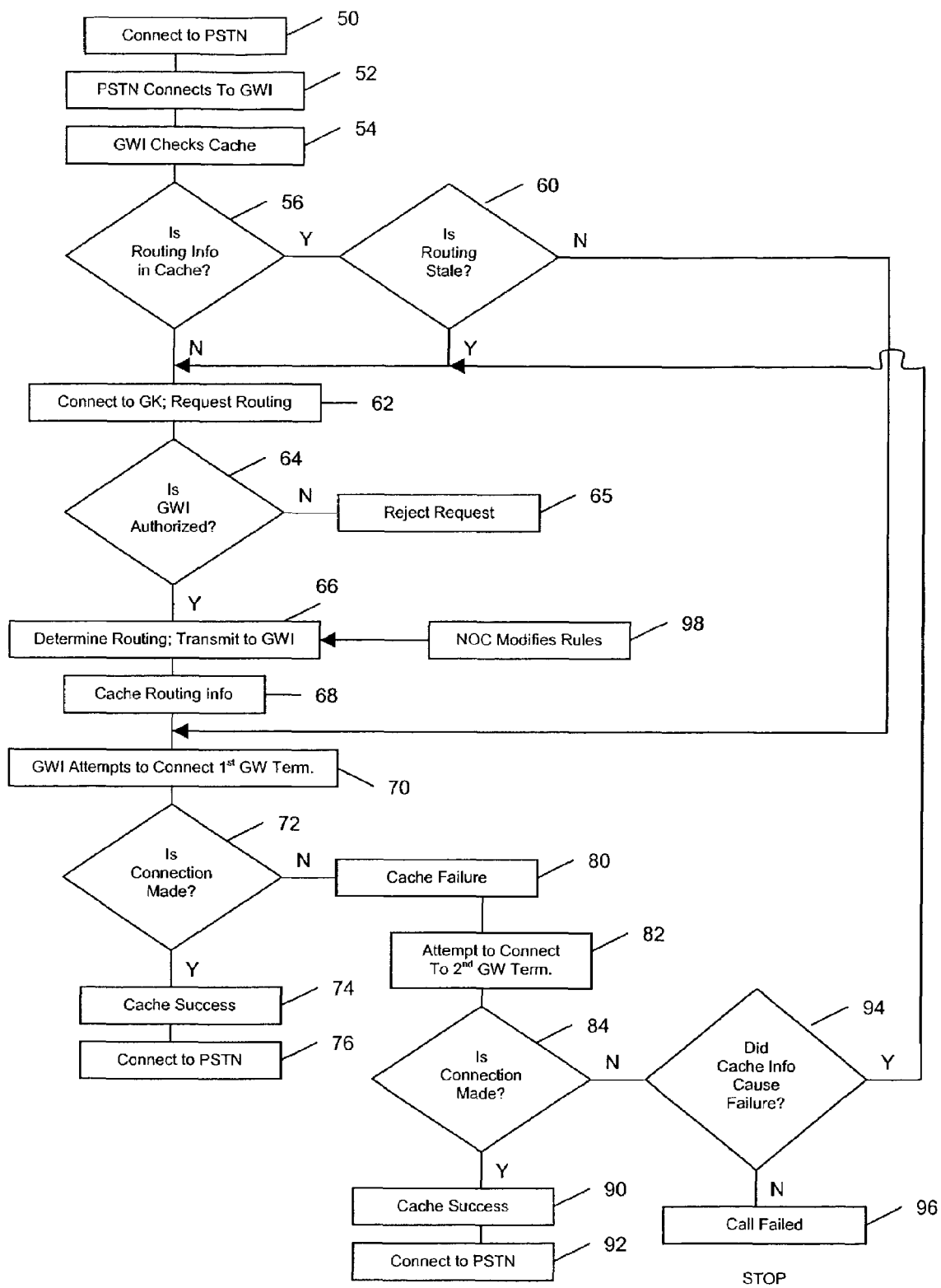
FIG. 2 is a flowchart showing the method of the present invention.

Referring now to FIG. 2, a description of the preferred method follows. Upon initiation of a call from caller device 10, a connection is established to PSTN 14a in step 50. In order to complete the communication session by way of the Internet, or other network, PSTN 14a establishes a connection to originating GW1 20 in step 52. GW1 20 is programmed to save, or cache, previously used preferred routing. For control purposes, a related authorization token may be issued. If such an authorization token is provided and it is useful for multiple uses, it is saved in a cache (not shown). It is recognized that it is only useful to cache an authorization token if such token has use beyond the instant call request. Such a cache, or active memory device, may physically reside within GW1 20, at GK 30, or in another location, e.g. between GW1 20 and GK 30. Wherever a cache of previously used preferred routing is maintained, by originating GW1 20 accessing the cache as a first step, connection to GK 30 may be avoided. Additionally, GK 30 reviewing routing rules for a particular caller device is clearly avoided, GK 30 determining the appropriate routing for the particular caller device is clearly avoided, and GK 30 transmitting a routing decision to GW1 20 is also avoided. Bypassing these steps has the benefit of reducing the transaction time required for making a connection as well as reducing the amount of processing GK 30 is required to perform, thus preserving capacity. Further, the communication traffic on the system is reduced and the gatekeeper is caused to make fewer dips into databanks to access information.

GW1 20 checks the cache in step 54 and determines in step 56 whether the needed routing information is available for connecting a communication from caller device 10 to callee device 12. Typically, the primary identification of a callee is a telephone number, since the primary focus of the invention is voice communication. However, it is recognized that other indicia of a callee, for example a URL or even a name, are similarly usable. In addition to determining whether the preferred routing information is in the cache, GW1 20 also determines whether an authorization token exists and if the cached routing information and authorization token have been in the cache beyond its useful term, i.e. is stale, in step 60. Routing information may also be considered stale if the number of connections made since the information was established has exceeded a selected number. If the routing information is in the cache and is stale, or the routing information is not in the cache, or the routing information in cache does not succeed when utilized, a connection to GK 30 is made so as to request current routing information and authorization, in step 62. GK 30 determines from a database whether originating GW1 20 is an authorized user of the system in step 64. User authorization involves a pre-established relationship between GW1 20 and GK 30 as intermediary agent. If GW1 20 is not authorized, the request for routing is rejected in step 65.

If GW1 20 is authorized, GK 30 ascertains a prescribed one or more parameters of the call that are to be used to determine the routing. In a preferred embodiment, such parameters may include the called area code and one or more portions of the called telephone number. Additionally, parameters may also include the identity of the originating gateway, or any other desirable available information. GK 30 determines a preferred routing specific to a communication session between caller device 10 and callee device 12 to designate a specific terminating gateway in step 66, and GK 30 transmits the routing information to GW1 20, together with the criteria or characteristics upon which the routing was determined and an encrypted authorization token. The authorization token is coded, according to the preferred embodiment, with applicable limiting factors, e.g. that authorization applies only during certain hours, or for a prescribed number of calls, or until the end of a time period, or the authorization is considered stale. Upon receipt, in step

68, GW1 20 caches the routing information, token and basis criteria for future use, simultaneously overwriting any previously cached routing for this specific set of call criteria. It is also understood that prior and new routing instructions may be held for use as parallel, alternate options.

The transmitted routing information may be in the form of a list of one or more terminating gateways to use. It may also contain an ordered priority for the gateways, a list of gateways among which to divide traffic, or any other type of routing information required by the particular system in use in relation to a list of end IP devices.

According to an alternate embodiment, when GW1 20 receives a request from caller 10, GW1 20 immediately transmits a request to GK 30 for routing instructions. However, this routing request is automatically directed to a cache and a determination is made as to whether routing information and authorization already exist and are not stale. Optionally, the system may also decide based on one or more other criteria if the cached information is operable and/or desirable to use for the subject call. If so, the cache transmits the routing information directly to GW1 20 and deletes the request intended for GK 30. If no routing information is found in a cache, the request is forwarded on to GK 30. In either first or second embodiment, the routing request may be in the form of an SS7 query or other protocol.

As of receipt of routing information from GK 30, or alternatively as of a determination in step 60 that the available cached routing information is not stale, GW1 20 then initiates a connection to the recommended gateway, e.g. GW2 22, in step 70. GW1 20 then determines in step 72 whether the attempted connection succeeded. If the connection was made, the fact of a successful connection, useful for future routing determinations, is cached in step 74, and a connection to PSTN 14*b* is made in step 76. Thereupon the final link from PSTN 14*b* to callee device 12 is made and the communication proceeds. If the determination of step 72 is that the connection to GW2 22 failed, such failure is cached in step 80. Whereas when routing information is supplied from GK 30 to GW1 20 in step 64 above, if plural terminating gateways are available, a primary and one or more backup gateways are designated in the same routing information transmission. Therefore, following the failure of the first connection attempt, connection is attempted to a second recommended terminating gateway, e.g. GW3 24 in step 82. Again, GW1 20 determines if the connection has been successfully completed in step 84, with a successful connection result cached in step 90 followed by a connection to PSTN 14*b* in step 92. If it is determined in step 84 that the connection failed, a determination is made in step 94 whether the failure is because of incorrect or outdated information in the cache. If yes, the system reverts to step 62 to connect to GK 30 to request routing based on current information. If no, it is assumed that the failure is caused by the communication equipment and the call attempt is terminated in step 96. Decision 94 must have access to information indicating whether the routing information that has failed is from cache or from the gatekeeper. This information can be easily ascertained by simply setting a software indicator just prior to entering step 70 in FIG. 2, so that before the routing information is utilized, a record is maintained indicating whether it came from cache or from a remote location such as a gatekeeper.

An algorithm incorporated in the software of the present invention, rather than simply applying all connections to routing and a terminating gateway which appears to satisfy the established criteria, is provided to apportion to various routings according to a pattern. The criteria may be established so that primary status requires a cost within a selected percentage of the median time charge while providing better than 90% transmission quality. Whichever routing attains or comes closest to this guideline is allocated a major portion of connection traffic. However, since there may be occasions when the amount of incoming call traffic exceeds the available bandwidth of this routing, and since maintaining a viable market requires more than one option, a certain proportion of the traffic is to be allocated to a secondary, lower scoring, routing option.

GK 30 may, at various times or upon various happenings, proactively revise selection rules or call routings. For example, GK 30 may instruct one or all originating gateways to disregard previously cached routing guidelines. GK 30 may instruct an originating gateway to refresh or otherwise modify existing routing information, part of which modification may be based on a cached history of successful or unsuccessful connections.

NOC 32, as described briefly above, is included in the method of the present invention to provide to the network, specifically to GK 30, modified or new parameters for the determination of selected routing. In step 94, NOC 32 provides modified parameters or rules issued by GK 30 to evaluate the preferred routing for a specific communication session. In one embodiment, GK 30 installs the modified parameters in its memory in place of the previous parameters for use when requested. In a second embodiment, GK 30, in addition to installing the modified parameters, also creates and transmits to each affected originating gateway an instruction to delete previous routing information for those caller devices whose routing would potentially be changed. This step ensures that future connections benefit from updated information, resulting in optimum utilization of bandwidth and equipment.

A variety of variations to the basic technique will be apparent to those of ordinary skill in the art. For example, the cache could actually be stored in the gatekeeper or other intelligent node. In such a scenario, although the gateway would still have to contact a remote intelligent node to receive routing information, the processing of one or more rules to derive that routing information need not occur for each phone call. Additionally, since the execution of routing may involve communications between plural intelligent nodes, caching the routing information at the intelligent node would avoid the need for communications among plural intelligent nodes, with inherent reduction in cost and time delay, even if the communications between the gateway and the gatekeeper need to occur. Additionally, updates to the caching may occur periodically, or may occur in response to certain requests from gateways and/or upon the occurrence of certain conditions, e.g. telephone number to IP address resolution processed through an SS7 query or via ENUM protocol.

What is claimed is:

1. A method for determining call routing from an originating gateway to one of a plurality of terminating gateways in a network, comprising the steps of:
    (a) the originating gateway sending to a gatekeeper a request for routing information to a call recipient via one of the plurality of terminating gateways;
    (b) the gatekeeper determining the routing information from the originating gateway to the call recipient;
    (c) the gatekeeper transmitting to the originating gateway the routing information;
    (d) the originating gateway caching the routing information; and (e) the originating gateway initiating a connection to a priority gateway according to the routing information.

2. The method for determining call routing as described in claim 1 further comprising the gatekeeper determining whether the originating gateway is an authorized user of the system.

3. The method for determining call routing as described in claim 2, further comprising the gatekeeper transmitting an authorizing token to the originating gateway.

4. The method for determining call routing as described in claim 1, wherein before sending the request to the gatekeeper in step (a), the originating gateway verifies whether the routing information to the call recipient is in a cache.

5. The method for determining a call routing as described in claim 4, further comprising the originating gateway determining whether the routing information in the cache is stale.

6. The method for determining a call routing as described in claim 5, wherein if the routing information is stale, the originating gateway sends request to the gatekeeper for routing priority as in step (a).

7. The method for determining a call routing as described in claim 5, wherein if the routing information is not stale, the originating gateway initiates a connection to the priority terminal gateway without sending the request to the gatekeeper as in step (a).

8. The method for determining call routing as described in claim 1, wherein routing to one of the plurality of terminating gateways comprises designating a first selected gateway to which to first attempt connection and a second selected terminating gateway to which to subsequent attempt connection.

9. The method for determining call routing as described in claim 1, further comprising the gatekeeper communicating an instruction to the originating gateway to delete selected prior routing information cached in the originating gateway.

10. The method for determining call routing as described in claim 9, wherein the gatekeeper sends updates to the cached routing information to the originating gateway.

11. The method for determining call routing as described in claim 10, wherein the updates comprise deletion instructions for the cached routing information.

12. The method for determining call routing as described in claim 10, wherein the updates comprise modification instructions for the cached routing information.

13. The method for determining call routing as described in claim 1, wherein the gatekeeper determines the routing according to pre-established criteria.

14. The method for determining call routing as described in claim 13, wherein the pre-established criteria include indicia of the intended call recipient, service quality, service cost and connective speed of the priority terminating gateway.

15. The method for determining call routing as described in claim 14, wherein an authorization token is also sent to the gateway.

16. A system for determining call routing, comprising:
(a) an originating gateway in communication with a first client device through a PSTN;
(b) the originating gateway being in communication with a network;
(c) a gatekeeper in communication with the originating gateway;
(d) the originating gateway including a cache for storing routing instructions from the gatekeeper;
(e) a terminating gateway in communication with the network; and
(f) the terminating gateway in communication with a second client device through a PSTN;
(g) wherein the gatekeeper is configured for establishing routing for a call from the first client device to the second client device, the routing dependent upon pre-established criteria.

17. A method of routing a phone call over a packet data network comprising:
a) signaling a gateway that the phone call is to be routed;
b) communicating from the gateway to a remote node to obtain routing information;
c) caching the routing information by the gateway; and
d) utilizing said cached routing information to route a subsequent call;
wherein said cached routing information is stored along with an authentication token and an indicator of which parameters of a phone call are determinative of an outcome of a routing algorithm implemented at said remote node.

18. The method of claim 17 wherein the cached routing information is only utilized if it is not timed out.

19. The method of claim 17 wherein said cached routing information is stored along with an indicator of under what conditions said cached routing information is valid.

20. The method of claim 19 wherein said caching information is updated periodically.

21. Apparatus for routing a call over a data network comprising means for determining whether to route the call based upon cached routing information cached in a gateway or upon noncached routing information and means for routing said call based upon said routing information and in response to said means for determining making such determination;
wherein said apparatus is connected via a data network to a remote node that generates said noncached and said cached routing information, and said cached routing information is generated by said remote node during a prior call and stored at said apparatus, and said noncached routing information is generated by said remote node during said call.

22. Apparatus of claim 21 wherein said cached routing information includes data network addresses of one or more terminating gateways.

23. Apparatus of claim 22 wherein said cached routing information includes an authentication token for said terminating gateways to process.

* * * * *